(12) United States Patent
Moore

(10) Patent No.: US 7,594,615 B1
(45) Date of Patent: Sep. 29, 2009

(54) POP UP SPRINKLER RISER-CLAMP

(76) Inventor: William B. Moore, 465 Milford Point, Merritt Island, FL (US) 32952

( * ) Notice: Subject to any disclaimer, the term of this patent is extended or adjusted under 35 U.S.C. 154(b) by 342 days.

(21) Appl. No.: 11/642,398

(22) Filed: Dec. 20, 2006

(51) Int. Cl.
  *A01G 25/06* (2006.01)
(52) U.S. Cl. .................. 239/203; 239/200; 239/201
(58) Field of Classification Search ......... 239/200–207; 24/279, 514, 569; 269/50, 52, 77, 78
  See application file for complete search history.

(56) References Cited

U.S. PATENT DOCUMENTS

| | | | |
|---|---|---|---|
| 2,031,159 A | 2/1936 | Griffith | 29/89 |
| 3,257,079 A | 6/1966 | Ross | 239/113 |
| 3,624,717 A | 11/1971 | Brubaker | 74/11 |
| 4,078,726 A * | 3/1978 | Walto | 239/205 |
| 4,234,125 A * | 11/1980 | Lieding | 239/111 |
| 4,274,592 A | 6/1981 | Westhusin | 239/200 |
| 4,865,169 A | 9/1989 | Rachels et al. | 188/300 |
| 5,133,501 A | 7/1992 | Marshall | 239/201 |
| D468,612 S | 1/2003 | Coulter | D8/72 |
| 6,629,648 B1 | 10/2003 | Jones | 239/203 |
| 7,059,539 B2 | 6/2006 | Steingass et al. | 239/203 |
| 7,076,847 B2 | 7/2006 | Schwope | 24/569 |
| 7,121,478 B1 | 10/2006 | Jones | 239/203 |

* cited by examiner

*Primary Examiner*—Davis Hwu
(74) *Attorney, Agent, or Firm*—Brian S. Steinberger; Law Offices of Brian S. Steinberger, P.A.

(57) ABSTRACT

A handheld pop-up sprinkler riser-clamp for allowing sprinkler heads to be held in upright raised positions for maintenance work. A plastic block can have a side U-shaped cut-out with a continuous slot therebetween. A midportion of the U-shaped slot can have a widened opening that is greater in diameter than the rest of the U-shaped slot. The ends of the U-shaped cut-out can be held together with a screwable member. In operation the widened opening can be slipped over the raised head of the sprinkler head, and then the narrow portion of the clamp member is slid upon the exposed barrel neck of the sprinkler head and snapped into place so that the clamp holds and restricts the sprinkler head from moving back into its' base. The screwable fastener can adjust the width opening of the U-shaped slot as needed for different diameter necks. Maintenance workers can easily carry plural clamp members on their persons and in their pockets to easily slip on and look sprinkler heads in upright positions for maintenance service work. The invention does not damage sprinkler heads, requires few if any tools and allows maintenance work in substantially less time than using tools such as pliers and the like.

13 Claims, 5 Drawing Sheets

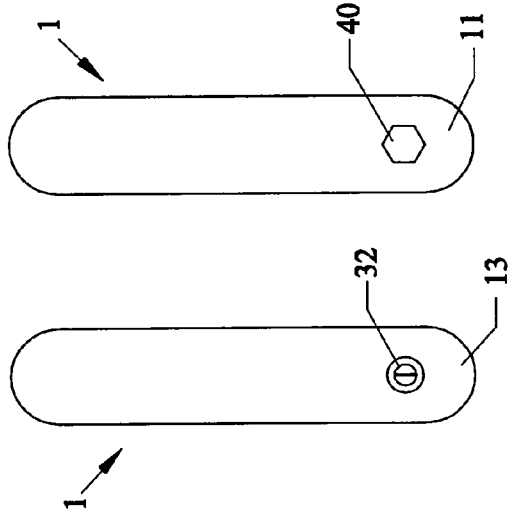
FIG. 3
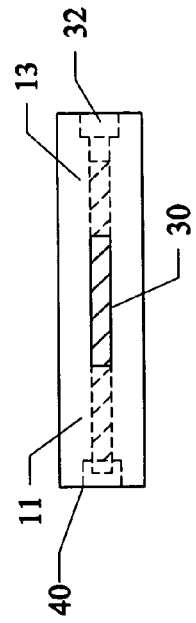
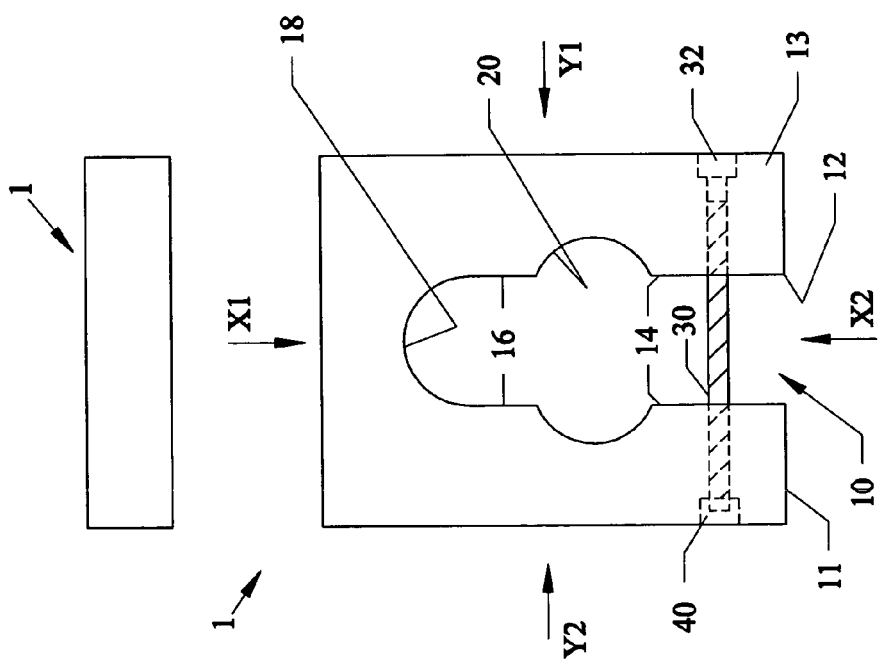

POP UP SPRINKLER RISER-CLAMP

This invention relates to sprinklers, in particular to devices, apparatus, systems and methods for holding and locking sprinkler heads in raised positions.

BACKGROUND AND PRIOR ART

Irrigation systems using pop-up sprinklers are generally used anywhere fine control of water direction and flow is needed. These types of sprinklers are usually located under the sod of mulch and pop up through a small opening when the water is turned on. The water pressure pushes on a plunger that raises the nozzle barrel. They are spring loaded and when the water is turned off, they go back down in the ground cover.

Irrigation systems that include pop-up sprinkler heads can get sand or dirt in the system. This occurs when sand is sucked up in the well, when a line breaks, or when the system is built. The pop-up sprinkler uses small holes to control the flow that can get clogged and do not work. The "pop-up's" are generally designed with a built in removable filter to keep the more expensive nozzle from getting plugged. Routine maintenance is required with the current systems.

The standard way to do maintenance is to turn the water on in a zone, walk around while the sprinklers are on, and mark any heads in need of maintenance with a small flag. Then turn off the water and go back to repair the flagged heads. A zone can be anywhere from ten to fifty heads. Providing maintenance for these sprinkler heads requires several steps.

In a first step, the nozzle has to be located under the grass. This is made more difficult since the sprinkler system was just on, which would have caused a puddle of water or a puddle of mud around the area of the head. Next, the individual sprinkler head is located. Next, the maintenance provider needs to grip the head usually with some type of tool, such as needle nose pliers, in order to pull the head up out of the grass. There is no designated place to grab the nozzle so the pliers often lose their grip and the head with spring back underground and the process has to be started all over again. Once the nozzle barrel is up it has to be held with one hand while all the maintenance work, such as cleaning out the head, and the like, is done with the other hand. There are several problems with the current maintenance process Besides the tedious chore of having to grip the head with tools such as pliers, the tool can damage the sprinkler head, since the head is often made of plastic. Often the head becomes scarred from the teeth of the pliers. Also, the tools can further damage the heads making the heads useless and needing to be replaced.

Additionally, the current maintenance process is difficult since it requires the maintenance provider to limit their maintenance work to only using one hand. This one hand operation is necessary since the maintenance provider must support the head in the upright position for maintenance work with the other hand. This current process will also cause the actual work to take longer since both hands cannot be easily used.

The inventor is aware of several prior art references. See for example, U.S. Pat. Nos. D468,612 to Coulter; 7,121,478; 7,076,847 Schwope; 7,059,539; 6,629,648 to Jones; 5,133,501 to Rachels; 4,274,592 to Westhusin; 3,257,079 to D. S. Ross; 3,624,717 to Brubaker; and 2,031,159 to R. W. Griffith describes a device for holding a cylinder. However, none of the individual references singularly or in combination overcome the problems described above.

Thus, the need exists for solutions to the above problems with the prior art.

SUMMARY OF THE INVENTION a primary objective of the present invention is to provide devices, apparatus, systems and methods for holding and locking pop-up sprinkler heads in raised positions with clamps that do not damage the sprinkler heads.

A secondary objective of the present invention is to provide devices, apparatus, systems and methods for holding and locking pop-up sprinkler heads in raised positions that allow service persons to use both hands for maintenance work to the pop-up heads.

A third objective of the present invention is to provide devices, apparatus, systems and methods for holding and locking pop-up sprinkler heads in raised positions that substantially reduces the labor time to do maintenance work to the pop-up heads.

A fourth objective of the present invention is to provide devices, apparatus, systems and methods for holding and locking pop-up sprinkler heads in raised positions using inexpensive components that are easily adjustable for different sized pop-up heads.

The invention search encompassed a clamp device to hold nozzle heads on conventional sprinklers in upright extended positions for service maintenance work. The invention is a clamp that clips over the nozzle barrel. It is simply snapped on the barrel while the water is on and the nozzles are up. When the water is turned off the nozzle barrel is held up against the internal spring. This allows the maintenance phase to be done much quicker. It can save up to 80% of the labor it takes to do the actual work.

A preferred embodiment can include a clamp member having a U-shaped opening in one side with a continuous narrow width slot. The slot can have a widened area in a mid-section of the continuous narrow width slot spaced from an inner end. In operation, a sprinkler head is lifted to a raised position with an exposed neck extended up above a sprinkler base, followed by sliding the widened area of the U-shaped opening down about the exposed next neck, followed by sliding the clamp member so that the neck underneath sprinkler head is held within the narrow width slot of the U-shaped opening restricts the sprinkler head from moving back into the sprinkler base.

The clamp member can be machined from a plastic block with machined out cut-out openings/grooves. Alternatively, the clamp member with opening/grooves can be formed from injection molded plastic.

The U-shaped opening can include a cut-out in one side of the plastic block. An adjustable screw fastener can be used for fastening outer ends of the U-shaped opening together. A locknut at one end of the adjustable screw fastener is for allowing the ends of the U-shaped opening to be adjusted with a 5/16 inch wrench. The screw fastener can include a slotted pan head. The screw fastener can be used with tools that are popular among sprinkler maintenance workers.

The widened area in the U-shaped slot can include a substantially cylindrical shape with a diameter greater in size than a diameter of the sprinkler head. The inner end of the U-shaped opening can a rounded curved end inside the clamp member. The inside curved end in the continuous narrow width slot can have a width of less than approximately ¾ of an inch. The continuous narrow width slot in the U-shaped slot can have a width of less than approximately ¾ of an inch.

A novel method of holding and locking sprinkler heads in upright positions for maintenance work, can include the steps of providing a sprinkler base with a pop-up head and neck, providing a clamp member having a U-shaped cut-out into one side, the U-shaped cut-out having a widened cut-out portion in a midportion away from an inner end, the widened cut-portion having a greater width than a width of the U-shaped cut-out, raising the pop-up head and the neck from the sprinkler base, slipping the widened cut-out portion of the clamp member over the pop-up head, lowering the enlarged cut-out portion of the clamp member down about the pop-up head to a portion of the neck, sliding the clamp member so that the inner end of the U-shaped cut-out slides about the neck of the sprinkler, and clamping the pop-up head in the raised position so the clamp member restricts the pop-up head from dropping back into the sprinkler base.

The method can further include the step of tightening outer ends of the U-shaped cut-out with a screwable fastener. Tightening can be accomplished with a 5/16" wrench. Tightening can be accomplished by using a slotted pan head on the screwable fastener.

Further objects and advantages of this invention will be apparent from the following detailed description of the presently preferred embodiments which are illustrated schematically in the accompanying drawings.

BRIEF DESCRIPTION OF THE FIGURES

FIG. 1 is a top view of the novel riser-clamp

FIG. 2 is a front end view of the riser-clamp of FIG. 1 along arrow X1.

FIG. 3 is a rear end of the riser-clamp of FIG. 1 along arrow X2.

FIG. 4 is a right side view of the riser-clamp of FIG. 1 along arrow Y1.

FIG. 5 is a left side view of the riser-clamp of FIG. 1 along arrow Y2.

DESCRIPTION OF THE PREFERRED EMBODIMENTS

Figure 6:
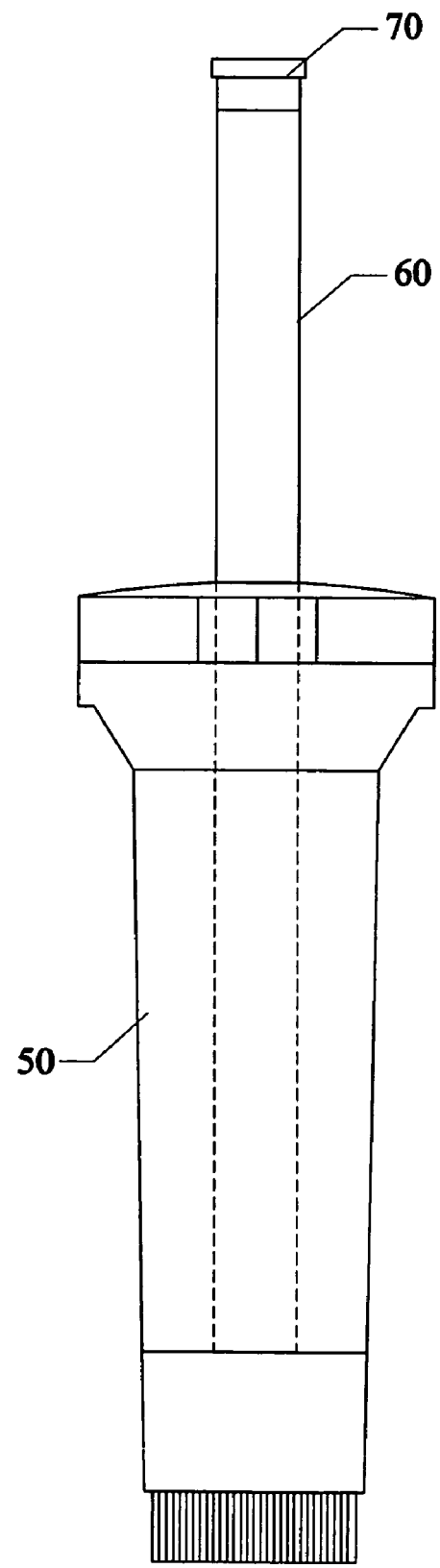
FIG. 6 is a view of the sprinkler with pop-up head in raised position.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

An identification of component labels is listed below.
1 clamp member
10 U-shaped cut-out
11 open end side
12 open end of cut-out
13 open end side
14 inner parallel straight sides
16 inner parallel straight sides
18 inner curved end of cut-out
20 widened midportion of cut-out
30 screw fastener
32 screw head
40 lock nut
50 individual sprinkler
56 upper edge of main sprinkler body
60 barrel neck
70 sprinkler head FIG. 1 is a top view of the novel riser-clamp/clamp member 1. FIG. 2 is a front end view of the riser-clamp/clamp member 1 of FIG. 1 along arrow X1. FIG. 3 is a rear end view of the riser-clamp/clamp member 1 of FIG. 1 along arrow X2. FIG. 4 is a right side view of the riser-clamp/clamp member 1 of FIG. 1 along arrow Y1. FIG. 5 is a left side view of the riser-clamp/clamp member 1 of FIG. 1 along arrow Y2.

Referring to FIGS. 1-5, the novel clamp 1 can be made from approximately ½ inch thick marine grade high density plastic, and the like. In a preferred embodiment a block having dimensions of approximately 2&¾" long by approximately 2&¼" wide by approximately ½" thick is milled to the proper shape and include novel U-shaped cut-out/groove 20 and widened opening/slot portion 30. Alternatively, the clamp member 1 with novel grooved slots/openings can be formed from injection-molded shapes.

The block 1 can include a U-shaped cut-out 10 having an open end 12, and an inner curved end portion 18, with a widened midportion 20. The U-shaped cut-out can include an approximately ¾" wide long groove. The cut-out 10 can be approximately 2&¼" long and is cut length wise from end 12 through the middle of the plastic block 1 to a inner curved end portion 18 approximately ½" from the opposite end 12.

The inner end 18 of the U-shaped cut-out 10 can have a curved edge, that forms a holding area for the neck 60 of the sprinkler 50, where the narrowest point of the holding area 18 is preferably smaller than approximately ¾".

At a midportion 20, a small portion is cut out left and right at a point approximately 1&⅛" from the opening end 22. The widened area 20 can have a width of approximately 1&½ inches and be substantially cylindrical so as to be wider in diameter than a sprinkler head 70 to be described later in greater detail. The widened area 20 is where the unit slips over the nozzle barrel neck 60 of the individual sprinkler 50.

Along the inside of the U-shaped cut out 10 can be inner parallel straight sides 14, 16 to both sides of the widened out portion 20.

An approximately 2" long #6 machine screw type fastener 30 can be inserted through predrilled and countersunk holes approximately ⅜" from the end where the U-shaped groove 10 is started at open end 12. The two end sides 11, 13 of the clamp member 1 can be bolted together with a locknut 40. The locknut 40 can use a 5/16" wrench and the machine screw 30 can have a slotted pan head 32. In a preferred embodiment, a maintenance worker will have a 5/16" wrench and screw drivers that work with a slotted pan head screw. These are two tools that generally all irrigation maintenance.

Figure 7:
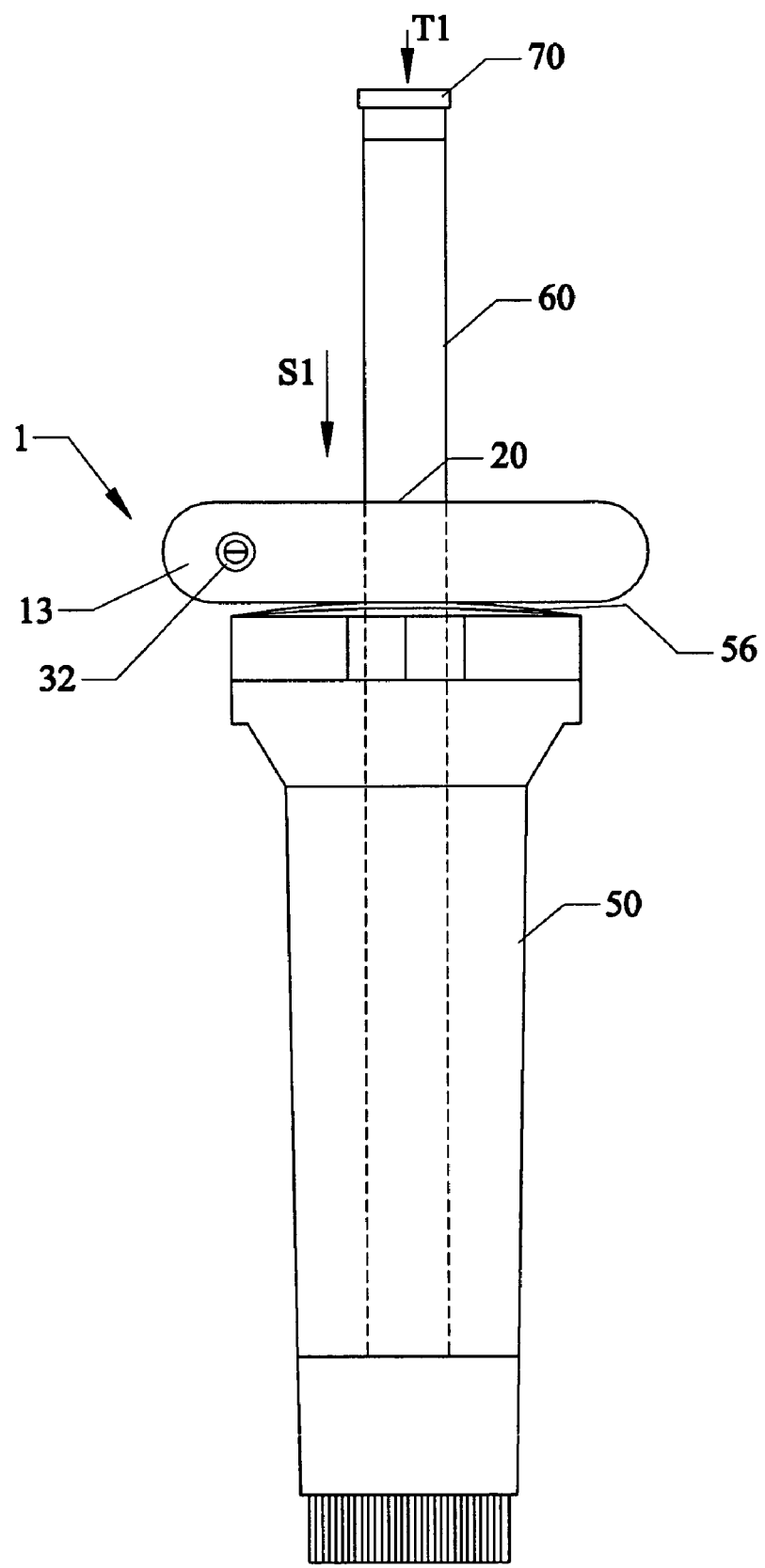
FIG. 7 is a side view of the widened opening in the riser-clamp of the proceeding figures being slipped over the raised pop-up sprinkler head of FIG. 6 and lowered in the direction of arrow S around the exposed neck of the individual sprinkler.
Figure 8:
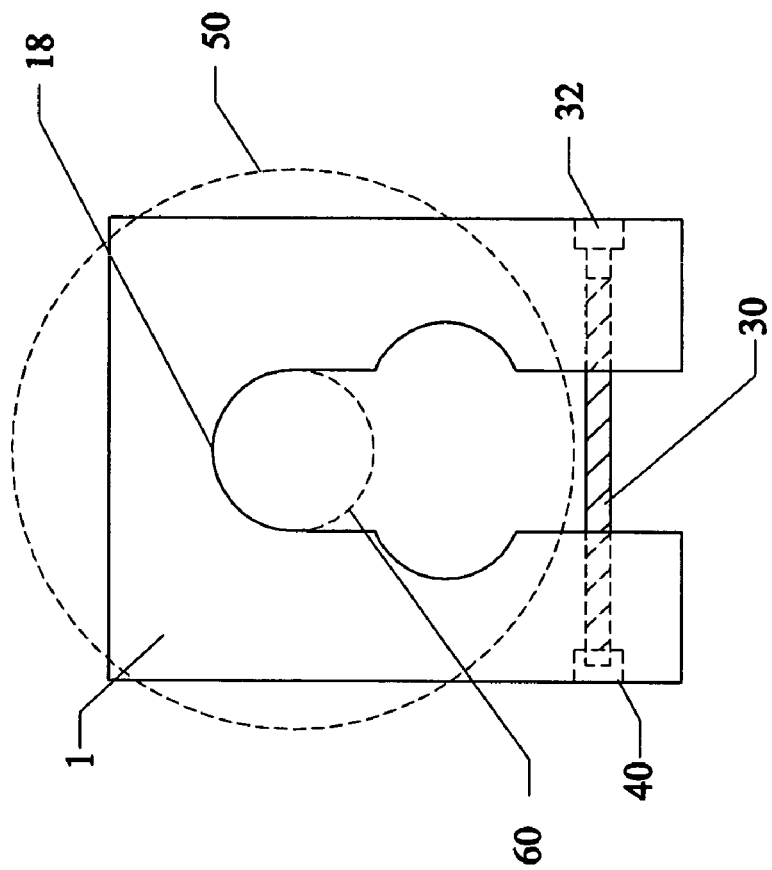
FIG. 8 is a top view of the lowered riser-clamp on the sprinkler of FIG. 7 along narrow T1.
Figure 10:
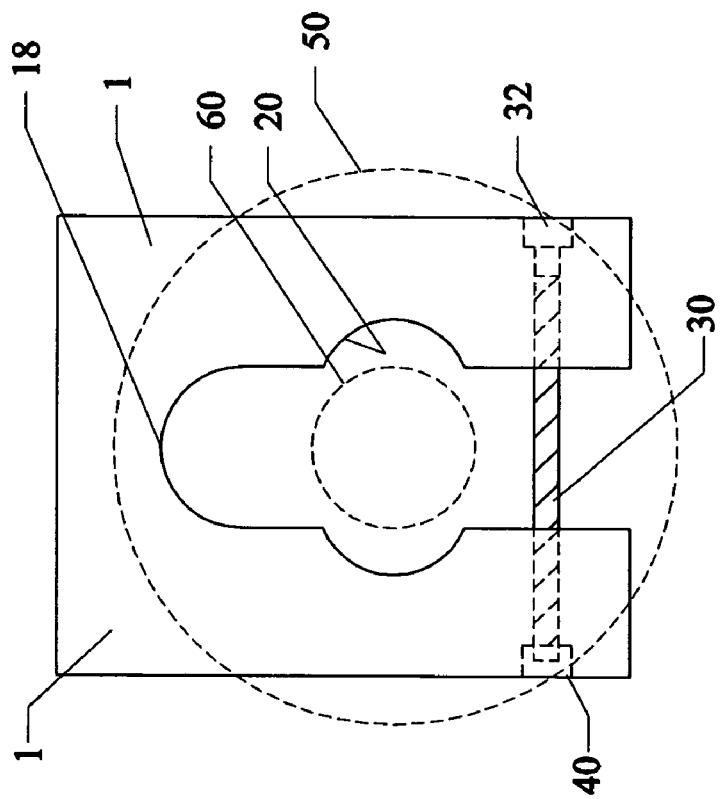
FIG. 10 is a top view of the locked riser-clamp about the exposed neck of the sprinkler shown in FIG. 9 along arrow T2.
Figure 9:
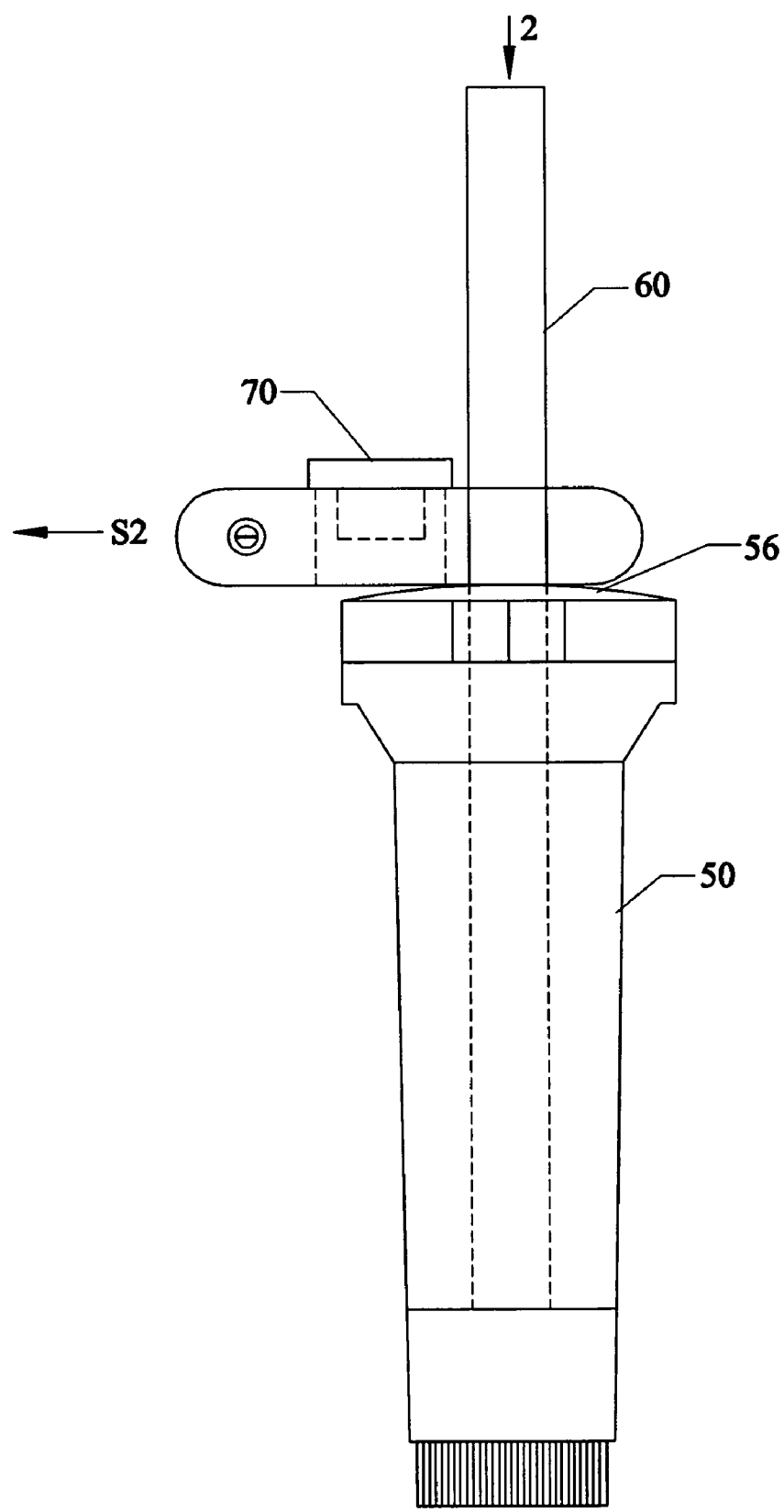
FIG. 9 is a side view of the riser-clamp after being slid in the direction of arrow S2 about the exposed neck on the individual sprinkler into a lock position.

The assembly and method of using the invention will now be described. FIG. 6 is a view of the sprinkler 50 with pop-up head 70 in raised position. FIG. 7 is a side view of the widened opening 20 in the riser-clamp/clamp member 1 of the preceding figures being slipped over the raised pop-up sprinkler head 70 of FIG. 6 and lowered in the direction of arrow S around the exposed neck 60 of the individual sprinkler 50. FIG. 8 is a top view of the lowered riser-clamp/clamp member 1 on the sprinkler 50 of FIG. 8 along arrow T1. FIG. 9 is a side view of the riser-clamp/clamp member 1 after being slid in the direction of arrow S2 about the exposed neck 60 on the individual sprinkler 50 into a lock position. FIG. 10 is a top view of the locked riser-clamp/clamp member 1 about the exposed neck 60 of the sprinkler 50 shown in FIG. 9 along arrow T2.

Referring to FIGS. 6-10, the invention clamp member 1 clips over the nozzle barrel 60 of the pop-up sprinkler 50. The novel clamp member 1 can be simply snapped on the barrel neck 60 while the water to the sprinkler 50 is turned on and the nozzle heads 70 are up. When the water is turned off the nozzle barrel neck 60 is held up against the internal spring of the sprinklers 50. This allows the maintenance phase to be done much quicker. It can save up to 80% of the labor it takes to do the actual work.

Alternatively, the water can be turned off to the sprinkler(s) 50, and each of the nozzle heads 70 can be pulled upward against the internal spring bias so that the clamp member 1 can be clamped in place.

In operation, the tightening of the locknut 40 can increase the tension on the barrel neck 60. Once the tension is set, the clamp member 1 will not need further adjustment. The squeezing together of the ends 11, 13 of the clamp member 1 squeezes the U-shaped slot 10 at the bottom. The narrowest point of the holding area 18 of the U-shaped slot 10 is smaller than approximately ¾" wide that matches the barrel neck 60 diameter. The clamp 1 springs slightly open when it is pushed in the direction of arrow S2 to the widest point of barrel neck 60. When it passes this point there is less pressure on the barrel so it snaps to the inner end 18 of the U-shaped slot 10. The straight not tapered sides 16 of the holding area 18 provide maximum grip. The durability, workability, and flexibility of the plastic are also key to how the clamp member 1 works. The holding area 18 has straight sides 16 and rounded end, and opening between sides 16 being approximately ¾ inch. As noted, the widened slip on area 20 can be substantially cylindrical with a diameter greater in size than the head diameter of the both the sprinkler head nozzle 70 and neck 60.

The steps for using the clamp member 1 after the head 70 and nozzle neck 60 are in a raised position can include slipping the widened cut-out portion 20 of the clamp member 1 over the pop-up head 70. Next, the clamp member can be lowered down in the direction of arrow S1 about the pop-up head to a portion of the neck 60, and can rest on an upper edge 56 of the sprinkler base 50. Next, the clamp member 1 can be slid in the direction of arrow S2 so that the holding area 18 of the U-shaped cut-out slides about the neck portion 60 of the sprinkler 50. This effectively clamps the pop-up head 70 in the raised position so the clamp member 1 restricts the pop-up head 70 from dropping back into the sprinkler base 50.

After the clamp member 1 is mapped in place as shown in FIGS. 9-10, the head 70 can be removed and temporarily placed in the widened cut-out 20 in the clamp member 1 so that it does not become misplaced, and is easily accessible after maintenance work on the sprinkler 40 is concluded.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A pop-up sprinkler riser-clamp comprising:
   a clamp member;
   a U-shaped cut-out in one side of the clamp member, the U-shaped cut-out having a curved inner end within the clamp member, and an open end along the one side of the clamp member;
   a first longitudinal-continuous narrow width slot located along the U-shaped cut-out that starts from the curved inner end, and having a first pair of parallel spaced apart inner side walls having a fixed first diameter;
   a second longitudinal narrow width slot located along the U-shaped cut-out that starts from the open end of the clamp member, and having a second pair of parallel spaced apart inner side walls having a fixed second diameter, the first diameter of the first parallel spaced apart inner side walls being equal to the second diameter of the second pair of parallel spaced apart side walls, the first longitudinal narrow width slot being spaced apart from the second longitudinal narrow width slot, the first longitudinal narrow width slot being in series to the second longitudinal narrow width slot; and
   a cylindrical widened cut-out area located between the first longitudinal narrow width slot and the second longitudinal narrow width slot, the cylindrical widened cut-out area having a fixed diameter larger than the diameter of both the first and the second longitudinal narrow width slots, the cylindrical widened cut-out located substantially in a mid-section between the curved inner end within the clamp member and the open end along one side of the clamp member, so that the cylindrical widened cut-out area is spaced apart from both the curved inner end and the open end of the clamp member, wherein raising a sprinkler head to a raised position with an exposed neck extended up above a sprinkler base, and sliding the cylindrical widened cut-out area of the U-shaped opening down about the exposed next neck, followed by sliding the clamp member so that the neck underneath sprinkler head is held within the first pair of parallel spaced apart inner side walls of the first longitudinal narrow width slot of the U-shaped opening and against the curved inner end of the clamp member restricts the sprinkler head from moving back into the sprinkler base.

2. The pop-up sprinkler riser-clamp of claim 1, wherein the clamp member is a plastic block.

3. The pop-up sprinkler riser-clamp of claim 1, wherein the clamp member includes:
   an adjustable screw fastener for fastening outer ends about the second longitudinal narrow width slots of the U-shaped opening together, to fix the diameter of the cylindrical widened cut-out area and the first diameter of the first longitudinal narrow width slot and the second diameter of the second longitudinal narrow width slot.

4. The pop-up sprinkler riser-clamp of claim 3, further comprising:
   a locknut at one end of the adjustable screw fastener for allowing the ends of the U-shaped opening to be adjusted with a 5/16 inch wrench.

5. The pop-up sprinkler riser-clamp of claim 4, wherein screw fastener includes:
   a slotted pan head.

6. The pop-up sprinkler riser-clamp of claim 1, wherein the continuous narrow width slot includes a width of less than approximately ¾ of an inch.

7. A method of holding and locking sprinkler heads in upright positions for maintenance work, comprising the steps of:
   providing a sprinkler base with a pop-up head and elongated neck;
   providing a clamp member having a U-shaped cut-out into one side of the clamp member;

providing the U-shaped cut-out with a curved inner end within the clamp member, and an open end along the one side of the clamp member;

providing a first longitudinal continuous narrow width slot located along the U-shaped cut-out that starts from the curved inner end, and having a first pair of parallel spaced apart inner side walls;

providing a pre-set first diameter between the first pair of parallel spaced apart inner side walls;

providing a second longitudinal narrow width slot located along the U-shaped cut-out that starts from the open end of the clamp member, and having a second pair of parallel spaced apart inner side walls;

providing a pre-set second diameter between the second pair of parallel spaced apart inner side walls;

providing the first diameter of the first parallel spaced apart inner side walls is approximately equal to the second diameter of the second pair of parallel spaced apart side walls;

providing the first longitudinal narrow width slot is spaced apart from the second longitudinal narrow width slot;

providing the first longitudinal narrow width slot is in series to the second longitudinal narrow width slot;

providing a cylindrical widened cut-out area located between the first longitudinal narrow width slot and the second longitudinal narrow width slot;

providing the cylindrical widened cut-out area with a diameter larger than the diameter of both the first and the second longitudinal narrow width slots;

providing the cylindrical widened cut-out is located substantially in a mid-section between the curved inner end within the clamp member and the open end along one side of the clamp member, so that the cylindrical widened cut-out area is spaced apart from both the curved inner end and the open end of the clamp member;

raising and separating the pop-up head and exposing the elongated neck from the sprinkler base;

slipping the cylindrical widened cut-out of the clamp member over and about the pop-up head;

lowering the cylindrical widened cut-out of the clamp member down about the pop-up head to a portion of the exposed elongated neck;

sliding the clamp member so that the first pair of parallel spaced apart inner side walls of first narrow width slot slides about the portion of the exposed elongated neck of the sprinkler; and clamping the portion of the exposed elongated neck within the first pair of parallel spaced apart inner side walls of the first narrow width slot by the sliding of the clamp member so that the pop-up head is locked in the raised position and so the clamp member restricts the pop-up head from retracting back into the sprinkler base.

8. The method of claim 7, further comprising the step of:

tightening outer ends of the U-shaped cut-out with a screwable fastener before the steps of raising, slipping, lowering, sliding, and clamping.

9. The method of claim 8, wherein the tightening step includes the step of:

tightening with a $5/16$" wrench.

10. The method of claim 9, wherein the tightening step includes the step of:

tightening a slotted pan head on the screwable fastener.

11. The method of claim 8, wherein the sliding step includes the step of:

snapping the clamp member to the exposed portion of the elongated neck of the sprinkler.

12. The pop-up sprinkler riser-clamp of claim 1, wherein the widened area cut-out has a diameter of approximately 1&½ inches, and both the the first diameter of the first parallel spaced apart inner side walls of the first longitudinal narrow width slot and the second diameter of the second parallel spaced apart inner side walls of the second longitudinal narrow width slot each has a diameter of approximately ¾ of an inch.

13. The pop-up sprinkler riser-clamp of claim 12, wherein the first longitudinal narrow width slot and the second longitudinal narrow width slot have a combined length of approximately 1¼" long, and the widened are cut-out area is spaced approximately 1&⅛" from the open end of the clamp member.

* * * * *